United States Patent [19] [11] 4,127,274
Griffith [45] Nov. 28, 1978

[54] TONE ARM SYSTEM FOR RECORD TURNTABLE

[76] Inventor: Joseph W. Griffith, 8705 SW. White Ct., Portland, Oreg. 97225

[21] Appl. No.: 868,903

[22] Filed: Jan. 12, 1978

Related U.S. Application Data

[63] Continuation of Ser. No. 739,522, Nov. 8, 1976, abandoned.

[51] Int. Cl.² ............................................. G11B 3/18
[52] U.S. Cl. ................................................. 274/23 R
[58] Field of Search ............................ 274/23 R, 23 A

[56] References Cited

U.S. PATENT DOCUMENTS

| 2,972,483 | 2/1961 | Rodgers | 274/14 X |
| 3,031,196 | 4/1962 | Rabinow | 274/23 R |
| 3,096,655 | 7/1963 | Peterson | 33/344 X |
| 3,836,155 | 9/1974 | Joannou | 274/37 |

FOREIGN PATENT DOCUMENTS 1,171,170 5/1964 Fed. Rep. of Germany ........ 274/23 R
1,429,380 1/1966 France ................................... 274/23 R Primary Examiner—Harry N. Haroian
Attorney, Agent, or Firm—Oliver D. Olson

[57] ABSTRACT

For use with a turntable structure for rotating a sound-recorded disc, an elongated tone arm is mounted pivotally intermediate its ends by a gimbal structure in which concentric rings are pivoted at right angles to each other by means of resilient torsion members which allow the tone arm to pivot, substantially without friction, both horizontally and vertically. The outer end of the arm mounts a cartridge stylus and the inner end mounts a longitudinally adjustable counterbalancing weight. Cooperating magnets are mounted on the tone arm and turntable base and are arranged to provide repelling magnetic forces to effect insertion of the stylus in the starting groove of a recorded disc and to effect removal of the stylus from the ending groove of the disc and return of the tone arm to a rest position. Energy absorbing material is contained on the tone arm to prevent the latter from resonating.

8 Claims, 6 Drawing Figures

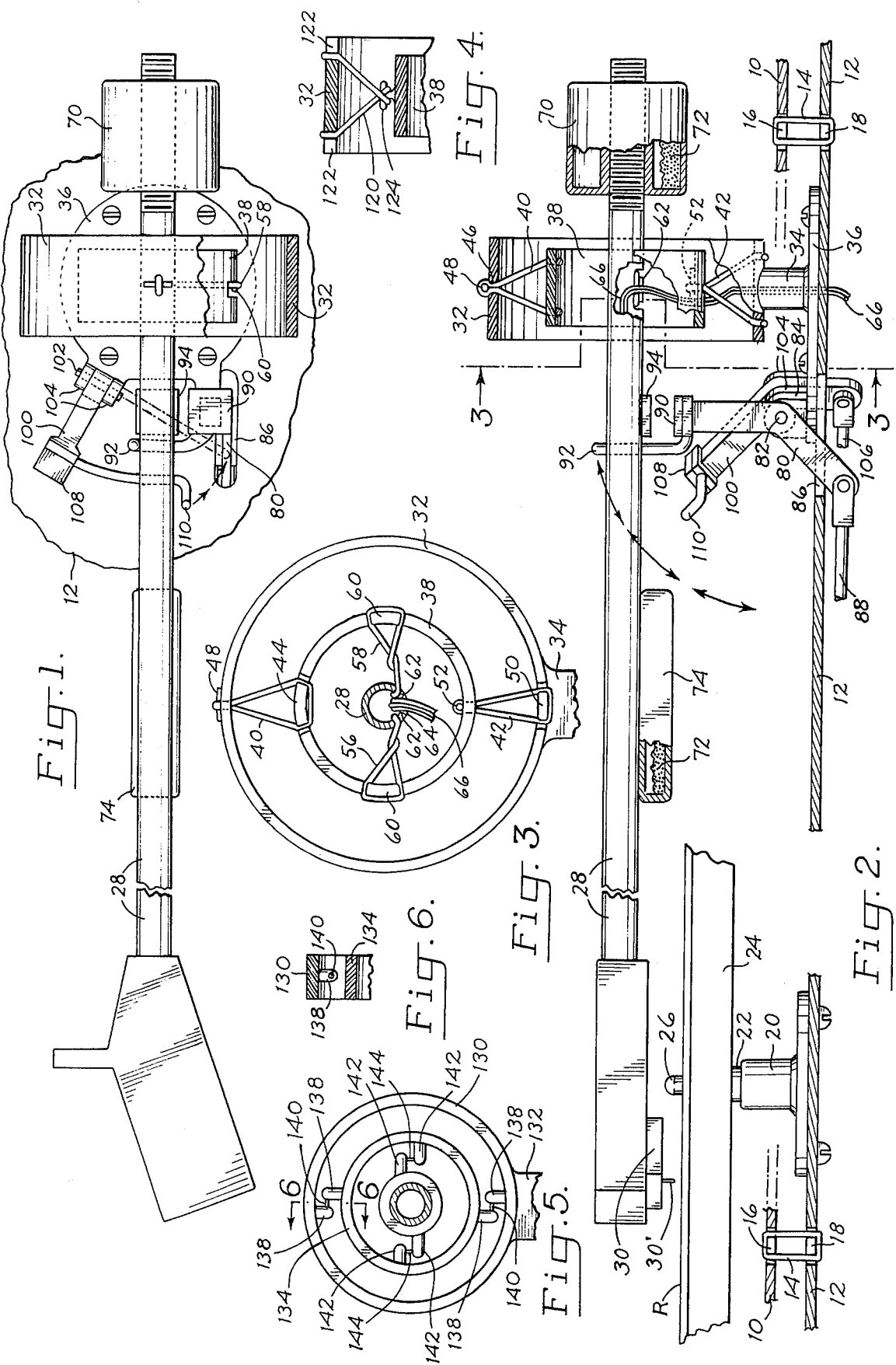

TONE ARM SYSTEM FOR RECORD TURNTABLE

This is a continuation, of application Ser. No. 739,522, filed Nov. 8, 1976 now abandoned.

BACKGROUND OF THE INVENTION

This invention relates to record players, and more particularly to a tone arm system by which to improve the quality of sound reproduction from sound-recorded discs rotated on a turntable and by which to improve the efficiency of mechanical movement of the stylus to and from such discs.

Historically, a tone arm, utilized to carry a cartridge stylus for reproducing the sounds recorded on a grooved disc rotating on a turntable, is supported on a hinged mount which allows the stylus to follow the vertical and horizontal motions required in reproducing the sounds contained in the grooved disc. In all cases, the operation of the hinge involves a degree of resistance determined by the coefficient of friction between the solid materials forming the bearings of the hinge. Thus, a coefficient of friction always is present, whether the hinge involves such structures as a direct sliding action of a shaft rotating in a cylinder, a pointed shaft rotated in a cone, a ball or roller bearing mount, the combination of a pointed shaft rotating on balls in a container, a conventional gimbal, a half gimbal with a rotating shaft in a cup, or a unit bearing utilizing a single ball mounted on a pedestal and supporting a tone arm carrying a cup which fits the ball.

The foregoing and other mechanical supports utilized heretofore for tone arms, are limited by the coefficient of friction between the materials. Such mechanical supports also transmit to the cartridge stylus transducer, not only mechanical noises caused by the inadequacies of the mechanical bearing supports to rotate freely, but also those sounds caused such as jars, bumps, vibrations and others originating at the supporting base for the turntable upon which the hinges are mounted. Even when such a base is isolated by rubber or spring mountings from an external cabinet, the sounds or vibrations felt by the base are transmitted along the tone arm to become reproduced along with the sounds recorded in the groove of the disc.

This undesirable sound transmission is due to the ability of the mechanical hinges to follow the motion of the supporting base. Directly mounted hinges follow the mounting base sounds exactly. Those hinges mounted in elastomeric sockets produce sounds which are limited in the frequency band to the lower end of the audible scale, but nevertheless these low frequency sounds are reproduced with the recorded sounds.

In addition to sounds transmitted through the mounting hinges, there is added the ability of the tone arm to vibrate resonantly, at a frequency transmitted to it through the mounting hinges and from the stylus sound. This resonance amplifies the effect of that sound as the stylus attempts to reproduce the sound in the groove of the recorded disc. Such resonance can appear as longitudinal motion along the tone arm as well as transversely across it.

Attempts have been made heretofore to reduce or modify this resonant tendency of the tone arm by use of materials such as wood, or by altering the shape of the tone arm. Although the use of wood reduces the Q, or increases the losses of the resonant arm, the resonance is not eliminated. Changing the shape of the tone arm, as by bending or curving, only increases the harmonic content of the tone resonated.

Additionally, tone arm systems of the automatic type provided heretofore utilize mechanical linkages and tracking mechanisms designed to interconnect the tone arm and associated turntable for inserting the stylus in the starting groove of a recorded disc and to effect removal of the stylus from the ending groove of the disc and return of the tone arm to a rest position. Such mechanical interconnections are subject to wear, and therefore require periodic maintenance and repair, and they contribute adversely to the generation of unwanted sounds.

Some manufacturers of tone arm systems have reverted to systems of the manual operating type in an effort to avoid the problems of drag and mass involved in the mechanisms for automatic operation. However, it is recognized that the human hand, even supported, is a clumsy, massive object with which to manipulate the characteristically delicate and light weight tone arm. Many scratched records and damaged stylii and cartridges, and the resulting distortions and other unwanted sounds, attest to this problem.

SUMMARY OF THE INVENTION

In its basic concept, this invention provides a tone arm system in which a tone arm is supported by resilient torsion members for horizontal and vertical movement of a sound transducer supported thereby. Cooperatmagnets on the tone arm and turntable base are arranged to effect, either manually or automatically, insertion of the stylus in the starting groove of a recorded disc and removal of the stylus from the ending groove of the disc and return of the tone arm to a rest position.

It is by virtue of the foregoing basic concept that the principal objective of this invention is achieved; namely, to overcome the aforementioned disadvantages and limitations of prior tone arm systems.

Another important objective of this invention is the provision of a tone arm system of the class described which functions to minimize the ability of forces outside of the groove of a recorded disc to distort, impair, or otherwise adversely influence the faithful reproduction of the sounds recorded in the groove of a rotary disc.

Still another important objective of this invention is the provision of a tone arm system of the class described in which prior mechanical interconnections between the tone arm and turntable are replaced by magnetic forces between said components, for controlling, either manually or automatically, the movement of the stylus to and from the groove of a recorded disc.

A further important objective of this invention is the provision of a tone arm system of the class described which is of simplified construction for economical manufacture and which is adaptable for incorporation into a wide variety of turntable assemblies presently available in the market place.

The foregoing and other objects and advantages of this invention will appear from the following detailed description, taken in connection with the accompanying drawing of preferred embodiments.

BRIEF DESCRIPTION OF THE DRAWING

FIG. 1 is a foreshortened plan view, partially broken away, of a tone arm system embodying the features of this invention.

FIG. 2 is a foreshortened fragmentary view in side elevation of the system shown in FIG. 1, portions being broken away to disclose details of internal construction.

FIG. 3 is a fragmentary sectional view taken on the line 3—3 in FIG. 2.

FIG. 4 is a fragmentary sectional view illustrating an alternative resilient interconnection between concentric rings of the gimbal support shown in FIG. 2.

FIG. 5 is a fragmentary sectional view, similar to FIG. 3 illustrating an alternative form of construction of a resilient, gimbal support.

FIG. 6 is a fragmentary sectional view taken on the line 6—6 in FIG. 5.

DESCRIPTION OF THE PREFERRED EMBODIMENTS

Referring primarily to FIG. 2 of the drawing, there is shown for purposes of illustration a conventional form of turntable structure by which to rotate sound-recorded discs. The structure includes a rigid base plate 10 which forms the top panel of a cabinet. Below this top wall is a mounting plate 12 for a turntable and tone arm assembly. The mounting plate preferably is supported resiliently within the cabinet. In the embodiment illustrated, this resilient support is provided by a plurality of resilient loops 14, in the form of bands of rubber or other elastomeric material, interengaging tabs 16 and 18 which project into openings provided in the top panel 10 and mounting plate 12, respectively. The mounting plate thus is suspended resiliently from the top panel.

The mounting plate supports the bearing housing 20 for the vertical center support shaft 22 for the turntable 24. The bearing support extends upwardly from the mounting plate through an opening in the top panel 10 of the cabinet, the turntable being mounted on the vertical shaft above the top panel and connected to conventional turntable drive mechanism (not shown), as is well known. FIG. 2 illustrates a sound-recorded disc R supported on the turntable for rotation therewith, the record being centered on the turntable by means of a conventional vertical spindle 26 extending upwardly from the center of the turntable through a central opening in the disc, in conventional manner.

Associated with the turntable is an elongated tone arm 28 adapted to mount, at its forward end, a conventional stylus cartridge 30 capable of reproducing the sounds recorded in the groove of the disc. In accordance with this invention, the tone arm is supported intermediate its ends by a special gimbal structure in which concentric rings are pivoted at right angles to each other by means of resilient torsion members which allow the tone arm to pivot both horizontally and vertically, substantially without friction.

The gimbal structure illustrated in FIGS. 1, 2 and 3 includes a support member, shown as a ring 32, mounted on a pedestal 34 extending upwardly from an attaching plate 36 secured to the mounting plate 12. The pedestal extends upwardly through an opening in the top panel 10 of the cabinet.

Within the support ring 32 is positioned an outer gimbal ring 38. It is supported concentrically within the ring 32 by means of a pair of diametrically opposed resilient torsion members 40 and 42, disposed in a common vertical plane. In the embodiment illustrated, these resilient torsion members are provided by bands of rubber or other elastomeric material. As illustrated in FIGS. 2 and 3, the upper band 40 engages a tab 44 formed at each longitudinal edge of the ring 38, and an intermediate portion of the band 40 then is extended upward through a central opening 46 in the support ring 32 and looped over a retainer pin 48 which spans the opening and bears against the outer surface of the support ring. As discussed hereinafter, the pin is curved longitudinally on the outer radius of the support ring, so as to be restrained against rotation about its transverse axis.

As illustrated, the lower band 42 engages a pair of oppositely directed tabs 50 on the lowermost portion of the support ring 32 and its intermediate portion is extended upward through a central opening in the lower portion of the outer gimbal ring 38, and looped over a retainer pin 52. This pin preferably is straight and extends parallel to the longitudinal axis of the gimbal ring.

The bands 40 and 42 may be tensioned to vary the magnitude of torsion in either direction of rotation abouy the vertical diametrical axis. This is accommodated by twisting the bands on said vertical axis. This may be achieved, for example, by rotating the pins 48 and 52 in one direction or the other. Thus, by curving the pin 48 on the outer radius of the support ring 32, the pin is restrained against rotation from its adjusted position. Similarly, by providing a straight pin 52 on the inner side of the outer gimbal ring 38, it also is restrained against rotation from its adjusted position.

An inner gimbal ring is supported concentrically within outer gimbal ring 38 for pivotal movement on an axis substantially normal to the vertical pivot axis of the outer gimbal ring. In the embodiment illustrated in FIGS. 1-3, the inner gimbal ring is formed as a part of the elongated hollow tone arm 28, i.e., the gimbal ring is extended fore and aft to form the tone arm. It is supported within and connected to the outer gimbal ring 38 by a pair of resilient torsion members 56 and 58, illustrated in the form of bands of rubber or other elastomatic material. An outer portion of each band engages a tab 60 provided by cutting away a central portion of the outer gimbal ring 38 (FIG. 1) at diametrically opposed positions (FIG. 3), and an inner portion of each band engages a tab 62 formed by cutting away a portion of the hollow tone arm 28 (FIGS. 2 and 3)

The magnitude of torsion provided the bands 56 and 58 may be adjusted by twisting the bands in a desired direction and for a desired number of turns.

It is to be noted that the triangular configurations of the resilient bands 40, 42, 56 and 58 function advantageously to constrain motions axial to the tone arm 28 caused by the drag of the stylus 30' in the sound groove of a recorded disc.

It is to be noted, from FIGS. 2 and 3, that the opening 64 formed in the tone arm to provide the opposed tabs 62 for the torsion bands, also provides an opening through which to feed the electrical conductors 66 which connect the stylus cartridge 30 to the electric signal amplifying system of a record player associated with the turntable. The record player mechanism may be integrated with the turntable assembly, or it may be a completely separate unit, as is well known to those in the art.

As shown in FIG. 2, the electrical conductors 66 extend outwardly through the opening 64 in the tone arm and thence through openings in the outer gimbal ring 38, support ring 32 and pedestal 34 and registering openings in the pedestal base 36 and the turntable mounting plate 12.

Pivoting of the tone arm 28 about the horizontal axis of the torsion members 56 and 58 allows the stylus 30' (FIG. 2) to move vertically relative to the turntable 24 and hence to accommodate the normal warp of disc records R. The pressure of the stylus upon the bottom surface of the record groove is rendered adjustable by means of a counterweight 70 mounted on the rearward end portion of the tone arm, rearwardly of the supporting torsion members, for longitudinal adjustment relative thereto.

In the preferred embodiment illustrated, the counterweight is provided as a hollow member in which is freely confined a quantity of freely movable material 72 such as lead shot, or sand, or a liquid whose viscosity and surface torsion are such as to convert vibratory motions to heat. Similar energy absorbing material 72 also preferably is carried by the forward portion of the tone arm, as in a sealed container 74 attached to the tone arm. Such energy absorbing materials function to reduce the Q, or increase the vibratory losses of the tone arm and render it incapable of resonating.

Means also is provided in the tone arm system of this invention for manipulating the tone arm 28 and the stylus 30' carried thereby, relative to a sound-recorded groove disc R, without manual touching by the hands or mechanical interconnections between the turntable and tone arm. This is achieved in this invention by permanent magnets mounted on the tone arm and turntable base plate and arranged to provide magnetic forces by which to effect desired movement of the tone arm.

In the embodiment illustrated, "cueing" of the tone arm, i.e., positioning the stylus in the starting groove of a sound-recorded disc, is afforded by a bell crank lever 80 mounted pivotally intermediate its ends on a pivot 82 supported by an upstanding bracket 84 on the base 36 of the pedestal for the support ring 32. The lower portion of the lever extends through an opening 86 in the mounting plate 12 and is there connected pivotally to one end of an elongated control rod 88 the opposite end of which is positioned for engagement by the hand, for manual control, or by solenoid or other mechanism, for automatic operation. The opposite end of the bell crank lever 80 mounts a permanent magnet 90. It also mounts a stop rod 92 for abutment by the tone arm when the latter is in the position in which the stylus 30' registers with the starting groove of the recorded disc R.

Associated with the permanent magnet 90 on the bell crank lever is a permanent magnet 94 secured to the tone arm 28. In the position of adjustment of the bell crank lever illustrated in FIGS. 1 and 2, the magnets 90 and 94 are offset laterally and vertically from each other and with like magnetic poles facing each other. The repelling magnetic forces thus urge the tone arm against the stop 92 and maintains the stylus elevated slightly above the disc.

By operation of the control rod 88 to pivot the bell crank lever 80 counterclockwise about its pivot (FIG. 2) the stop 92 is retracted and the stylus 30' is lowered into the starting groove of the disc.

Magnetic means also is provided for removing the stylus from the ending groove of the disc and returning the tone arm is a normal rest position. In the embodiment illustrated, this is provided by a second bell crank lever 100 mounted pivotally intermediate its ends on a pivot 102 carried by a pair of brackets 104 on the pedestal base 36. The lower end portion of the bell crank lever extends downward through an opening in the mounting plate 12 for pivotal connection of one end of a control rod 106 the opposite end of which extends to an appropriate position for manual manipulation or for mechanical operation, as discussed hereinbefore in connection with the bell crank lever 80.

The upper end of the bell crank lever 100 mounts a permanent magnet 108, for cooperative association with the magnet 94 mounted on the tone arm 28. A stop rod 110 also is mounted on the lever 100. It extends laterally therefrom, as shown in FIG. 1.

In the retracted position of the bell crank lever 100 illustrated in FIGS. 1 and 2, the permanent magnet 108 has no influence upon the permanent magnet 94 secured to the tone arm. However, when the bell crank lever is pivoted clockwise (FIG. 2) to a position in which the upper portion of the bell crank lever is disposed vertically, the permanent magnet 108 is brought to a position slightly below the permanent magnet 94 on the tone arm and to the side thereof by which the repelling forces between the like poles of the magnets cause the tone arm to swing counterclockwise (FIG. 1) until it abuts the stop 110 which now has been brought to a vertical position for abutment by the tone arm. This position of abutment of the tone arm is its normal rest position, and is illustrated by the broken lines of FIG. 1. In this position the tone arm is pivoted counterclockwise from the full line position shown in FIG. 1.

Thus, when the stylus 30' reaches the end groove of the disc, the tone arm has been swung clockwise from the full line position shown in FIG. 1 to a position just inside the plane of the bell crank lever arm 100. Accordingly, when the bell crank lever arm is raised to its vertical position, the opposing magnetic forces between the magnets 108 and 94 cause the tone arm to pivot upwardly, removing the stylus from the groove, and then to swing counterclockwise to its normal rest position in abutment with the stop 110.

When it is desired once again to return the stylus 30' to the starting groove of a disc R, the bell crank lever arm 80 is raised and the bell crank arm 100 is lowered. The magnet 108 having been removed from influencing the magnet 94 on the tone arm, the repelling force of the other magnet 90 thus causes the tone arm to pivot clockwise (FIG. 1) back to the full line position against the stop 92, where the stylus is stationed above but in registry with the starting groove of the disc.

Connection of the torsion bands between the support ring 32 and outer gimbal ring 38 and between the inner and outer gimbal rings, may be achieved in a variety of ways other than the arrangements illustrated in FIG. 3. For example, FIG. 4 shows a torsion band 120 having its ends engaged on tabs 122, such as the 50 described hereinbefore, and an intermediate portion of the band is looped about a T-shaped hook 124 projecting from the outer surface of the outer gimbal ring 38. It will be apparent that the tabs 44, 50 and 120, pins 48 and 52 and hooks 124 may be reversed in positions from the positions illustrated, as desired.

FIG. 5 illustrates a modified form of resilient gimbal ring assembly which may be formed as a one-piece structure molded of synthetic resin. It includes an outer support ring 130 with its mounting pedestal 132, an outer gimbal ring 134 and an inner gimbal ring 136, the latter being dimensioned to receive the tone arm 28 thereon.

The outer gimbal ring 134 is secured to the support ring 130 for pivotal movement on a vertical diametrical axis, by means of two pairs of tabs 138, each pair being interconnected by a thin flexible web 140 which functions as a hinge. The hinge axis of the webs is located on the vertical diametrical axis of the gimbal ring 134.

In similar manner, the inner gimbal ring 136 is secured to the outer gimbal ring 134 by means of two pairs of tabs 142 interconnected by thin flexible webs 144 the hinge axis of which is disposed on a horizontal axis, i.e., perpendicular to the vertical axis of the webs 140 and on the diametrical axis of the ring 136.

It will be appreciated that the webs 140 and 144 function in the same manner as the resilient torsion bands described hereinbefore in providing pivot axes on vertical and horizontal planes. Although the elastic bands provide a degree of adjustment of torsional interconnection between the support ring and the outer and inner gimbal rings of FIG. 3, the embodiment of FIG. 5 provides the advantages of low cost, ease of integration with a tone arm and turntable, and constancy of torsional interconnection.

The operation of the tone arm system described hereinbefore is as follows: The disposition of components illustrated in FIGS. 1 and 2 of the drawings locates the stylus 30' vertically above the starting groove of a sound-recorded, grooved disc. Lowering of the stylus into the starting groove is achieved by manual or mechanical movement of the control rod 88 toward the right in FIG. 2, thereby pivoting the bell crank lever 80 counterclockwise about its pivot 82 and swinging the stop rod 92 downward away from abutment by the tone arm and moving the permanent magnet 90 downward away from influence relative to the permanent magnet 94 mounted on the tone arm. Accordingly, the tone arm pivots counterclockwise (FIG. 2) about the axis of the horizontally disposed torsion bands 56 and 58 (FIG. 3) or webs 144 (FIG. 5), lowering the stylus into the starting groove of the recorded disc.

During playing of the record, the stylus follows the spiral groove of the record R radially inward toward the center of the recorded disc, the tone arm swinging clockwise (FIG. 1) during this traverse, by virtue of the outer gimbal ring 38 or 134 pivoting clockwise about the vertical axis of the vertically disposed torsion bands 40, 42 (FIG. 3) or webs 140 (FIG. 5).

As the stylus traverses the ending groove of the recorded disc, the control rod 106 is moved manually or mechanically toward the left (FIG. 2) to pivot the bell crank lever 100 clockwise and elevate the permanent magnet 108 and stop rod 110 to the elevated, operative position shown in broken lines in FIG. 1. The permanent magnet 108 thus is brought to a position below and slightly clockwise from the permanent magnet 94 on the tone arm. The repelling forces of the confronting like poles of the permanent magnets 108 and 94 thus cause the tone arm to be swung slightly clockwise (FIG. 2), extracting the stylus from the ending groove. The opposing magnetic forces also urge the tone arm into counterclockwise rotation (FIG. 1), until the tone arm abuts the upwardly projecting stop 110. This is the normal rest position of the tone arm, by which the stylus is displaced radially outward from the outer periphery of the recorded disc R, to allow removal of the latter from the turntable for replacement by another record.

The tone arm is maintained in the normal rest position, with the stylus elevated above the horizontal plane of a record on the turntable and displaced radially outward therefrom, by the opposing magnetic forces of magnets 108 and 94.

When it is desired to return the stylus to a new record, the control rod 88 is moved toward the left (FIG. 2) to pivot the bell crank lever 80 clockwise about its pivot and elevate the permanent magnet 90 and stop 92 to the full line position illustrated in FIG. 2, and the control rod 106 is moved toward the right to pivot the bell crank lever 100 counterclockwise and lower the supported permanent magnet 108 and stop member 110 to the inoperative position shown in full lines in FIG. 2. The opposing magnet forces of the confronting like poles of the permanent magnets 90 and 94 thus cause the tone arm to swing clockwise (FIG. 1) about the vertical axis of the vertical torsion bands 40 and 42, by simultaneous clockwise rotation of the outer gimbal ring 38, until the tone arm abuts the stop 92. In this position the stylus once again is in vertical registration with, but elevated above, the starting groove of the recorded disc.

From the foregoing it will be appreciated that the present invention provides a tone arm system which utilizes a novel, frictionless pivot for a non-resonant tone arm, together with magnetic drive means for inserting the tone arm stylus into the starting groove of a recorded record and removing the stylus from the ending groove thereof. These novel features of this invention reduce to a minimum the ability of outside forces to influence the faithful reproduction of sounds recorded in the groove of a conventional disc type record.

It will be apparent to those skilled in the art that various changes may be made in the size, shape, type, number and arrangement of parts described hereinbefore. For example, the gimbal ring support member 32 or 130 need not be a complete ring, as illustrated, since it is required only that it provide support for the torsion members 40, 42 or 138, 140. The gimbal rings may be of square or other shape rather than circular, as illustrated. These and other changes may be made without departing from the spirit of this invention.

Having now described my invention and the manner in which it may be used, I claim:

1. A tone arm system for a disc record turntable, comprising:
    (a) an elongated tone arm having a stylus at one end thereof,
    (b) a support member, and
    (c) tensioned elastomeric mounting means extending between the support member and tone arm for mounting the tone arm intermediate its ends on the support member for pivotal movement of the tone arm about horizontal and vertical axes for moving the stylus in vertical and horizontal planes.

2. A tone arm system for a disc record turntable, comprising:
    (a) an elongated tone arm having a stylus at one end thereof,
    (b) a gimbal ring support member,
    (c) inner and outer substantially concentric gimbal rings,
    (d) a first pair of resilient bands of elastomeric material interconnecting the inner and the outer gimbal rings at substantially diametriclly opposite positions disposed in a substantially horizontal plane, and
    (e) a second pair of resilient bands of elastomeric material interconnecting the outer gimbal ring and gimbal support member at substantially diametrically opposed positions on the other gimbal ring disposed in a substantially vertical plane, (f) the inner gimbal ring supporting the tone arm within the outer gimbal ring for pivotal movement on the horizontal and vertical axes of the first and second pairs of resilient bands.

3. A tone arm system for a disc record turntable, comprising:
   (a) an elongated tone arm having a stylus at one end thereof,
   (b) a support mounting the tone arm for movement in vertical and horizontal planes,
   (c) a permanent magnet on the tone arm, and
   (d) control magnet means movable relative to the magnet on the tone arm selectively to repel the permanent magnet to move the stylus on the tone arm into the starting groove of a disc record and to move the stylus out of the ending groove of the disc record and return the tone arm to a normal rest position displaced from the disc record for allowing removal of the latter from the turntable.

4. A tone arm system for a disc record turntable, comprising:
   (a) an elongated tone arm having a stylus at one end thereof,
   (b) a gimbal ring support member,
   (c) inner and outer substantially concentric gimbal rings,
   (d) a first pair of resilient torsion members interconnecting the inner and outer gimbal rings at substantially diametrically opposed positions disposed in a substantially horizontal plane,
   (e) a second pair of resilient torsion members interconnecting the outer gimbal ring and gimbal support member at substantially diametrically opposed positions on the outer gimbal ring disposed in a substantially vertical plane,
   (f) the inner gimbal ring supporting the tone arm within the outer gimbal ring for pivotal movement on the horizontal and vertical axes of the first and second pairs of resilient torsion members,
   (g) a permanent magnet on the tone arm, and
   (h) control magnet means movable relative to the magnet on the tone arm selectively to repel the permanent magnet to move the stylus on the tone arm into the starting groove of a disc record and to move the stylus out of the ending groove of the disc record and return the tone arm to a normal rest position displaced from the disc record for allowing removal of the latter from the turntable.

5. A tone arm system for disc record turntable, comprising:
   (a) an elongated tone arm having a stylus at one end thereof,
   (b) a support mounting the tone arm for movement in vertical and horizontal planes,
   (c) a first permanent magnet on the tone arm,
   (d) a second permanent magnet and associated stop member mounted for movement toward and away from the first magnet,
   (e) the first and second magnets being disposed with like magnetic poles facing each other, whereby movement of the second magnet toward the first magnet repels the latter and urges the tone arm to move in said horizontal plane into abutment with the associated stop member, for locating the stylus above the starting groove of a grooved disc record, and movement of the second magnet away from the first magnet allows the tone arm to move in said vertical plane and lower the stylus into such starting groove, and
   (f) a third permanent magnet and associated stop member mounted for movement toward and away from the first permanent magnet,
   (g) the first and third magnets geing disposed with like magnetic poles facing each other, whereby movement of the third magnet toward the first magnet repels the latter and urges the tone arm to move in said vertical plane and elevate the stylus upward out of the ending groove of a grooved disc record and also urges the tone arm to move in said horizontal plane to move the tone arm to a normal rest position against the stop member associated with the third magnet.

6. A tone arm system for a disc record turntable, comprising:
   (a) an elongated tone arm having a stylus at one end thereof,
   (b) a gimbal ring support member,
   (c) inner and outer substantially concentric gimbal rings,
   (d) a first pair of resilient torsion members interconnecting the inner and outer gimbal rings at substantially diametrically opposed positions disposed in a substantially horizontal plane,
   (e) a second pair of resilient torsion members interconnecting the outer gimbal ring and gimbal support member is substantially diametrically opposed positions on the outer gimbal ring disposed in a substantially vertical plane,
   (f) the inner gimbal ring supporting the tone arm within the outer gimbal ring for pivotal movement on the horizontal and vertical axes of the first and second pairs of resilient torsion members,
   (g) a first permanent magnet on the tone arm,
   (h) a second permanent magnet and associated stop member mounted for movement toward and away from the first permanent magnet,
   (i) the first and second magnets being disposed with like magnetic poles facing each other, whereby movement of the second magnet toward the first magnet repels the latter and urges the tone arm to pivot about the axis of the second pair of torsion members into abutment with the associated stop member, for locating the stylus above the starting groove of a grooved disc record, and movement of the second magnet away from the first magnet allows the tone arm to pivot about the axis of the first pair of torsion members and lower the stylus into such starting groove, and
   (j) a third permanent magnet and associated stop member mounted for movement toward and away from the first permanent magnet,
   (k) the first and third magnets being disposed with like magnetic poles facing each other, whereby movement of the third magnet toward the first magnet repels the latter and urges the tone arm to pivot about the axis of the first pair of torsion members and elevate the stylus upward out of the ending groove of a grooved disc record and also urges the tone arm to pivot about the axis of the second pair of torsion members to move the tone arm to a normal rest position against the stop member associated with the third magnet.

7. A tone arm system for a disc record turntable, comprising:

(a) an elongated tone arm having a stylus at one end thereof, and (b) an integral, one-piece tone arm support structure of synthetic resin, comprising:

(1) a gimbal ring support member, (2) inner and outer substantially concentric gimbal rings, (3) a first pair of resilient web members interconnecting the inner and outer gimbal rings at substantially diametrically opposed positions disposed in a substantially horizontal plane and extending perpendicular to said horizontal plane for bending along their length in substantially vertical planes, (4) a second pair of resilient web members interconnecting the outer gimbal ring and gimbal support member at substantially diametrically opposed positions on the outer gimbal ring disposed in a substantially vertical plane and extending perpendicular to said vertical plane for bending along their length in substantially horizontal planes, (5) the inner gimbal ring supporting the tone arm for pivotal movement on the horizontal and vertical axes of the first and second pairs of resilient web members.

8. The tone arm assembly of claim 7 including (a) a first pair of tabs associated with each of the first pair of web members and projecting radially toward each other one from the inner gimbal ring and the other form the outer gimbal ring, the tabs of each first pair being spaced circumferentially from each other and interconnected by the associated first web member, and (b) a second pair of tabs associated with each of the second pair of web members and projecting radially toward each other one from the support member and the other from the outer gimbal ring, the tabs of each second pair being spaced circumferentially from each other and interconnected by the associated second web member.

* * * * *